United States Patent [19]

Kimball

[11] Patent Number: 5,493,183
[45] Date of Patent: Feb. 20, 1996

[54] OPEN LOOP BRIGHTNESS CONTROL FOR EL LAMP

[75] Inventor: Robert A. Kimball, Scottsdale, Ariz.

[73] Assignee: Durel Corporation, Chandler, Ariz.

[21] Appl. No.: 338,966

[22] Filed: Nov. 14, 1994

[51] Int. Cl.⁶ ........................................... G05F 1/00
[52] U.S. Cl. ................. 315/308; 315/314; 315/169.3; 315/156; 315/158; 315/DIG. 4
[58] Field of Search ................. 315/169.3, 169.2, 315/169.1, 156, 158, 308, 314, 77, 82, DIG. 4

[56] References Cited

U.S. PATENT DOCUMENTS

| | | | |
|---|---|---|---|
| 4,253,097 | 2/1981 | Hochstrate | 315/169.3 X |
| 4,449,075 | 5/1984 | D'Onofrio et al. | 315/169.3 |
| 4,527,096 | 7/1985 | Kindlmann | 315/169.3 |
| 5,089,748 | 2/1992 | Ihms | 315/151 |
| 5,272,327 | 12/1993 | Mitchell et al. | 315/158 X |
| 5,313,141 | 5/1994 | Kimball | 315/169.3 |
| 5,336,978 | 8/1994 | Alessio | 315/169.3 |
| 5,381,074 | 1/1995 | Rudzewicz et al. | 315/169.3 X |

*Primary Examiner*—Robert J. Pascal
*Assistant Examiner*—Haissa Philogene
*Attorney, Agent, or Firm*—Cahill, Sutton & Thomas

[57] ABSTRACT

An EL lamp characterized by non-linear brightness decay is driven to constant brightness for the life of the lamp by an inverter controlled by a microprocessor. The microprocessor controls the inverter in accordance with a table containing data which is the inverse function of the non-linear brightness decay. The microprocessor tracks the total on-time of the EL lamp and selects the appropriate data from the table for driving the lamp. Control can be analog or digital. If control is analog, the selected data is coupled to a D/A converter which is coupled to the inverter. If control is digital, the selected data is coupled to a counter driving a pulse width modulator which is coupled to the inverter. In accordance with another aspect of the invention, an EL lamp is dimmed a precise amount based upon the data in the table and the EL lamp can be dimmed in unison with other lamp types, each lamp type having a table containing data for dimming.

10 Claims, 1 Drawing Sheet

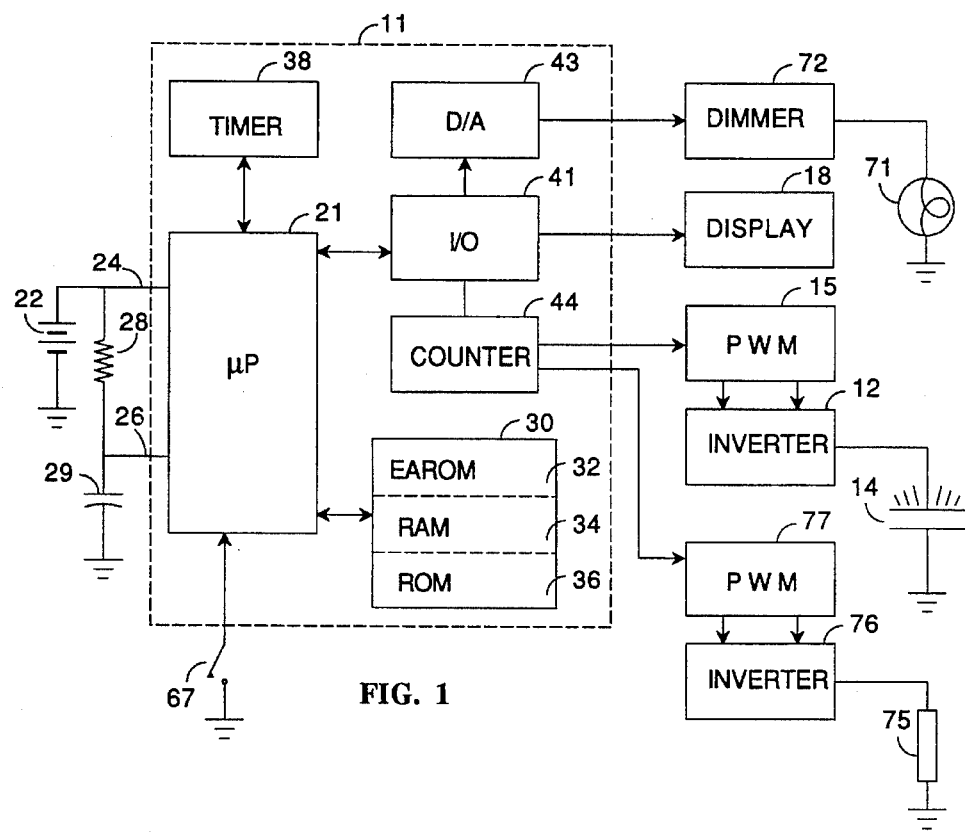
FIG. 1
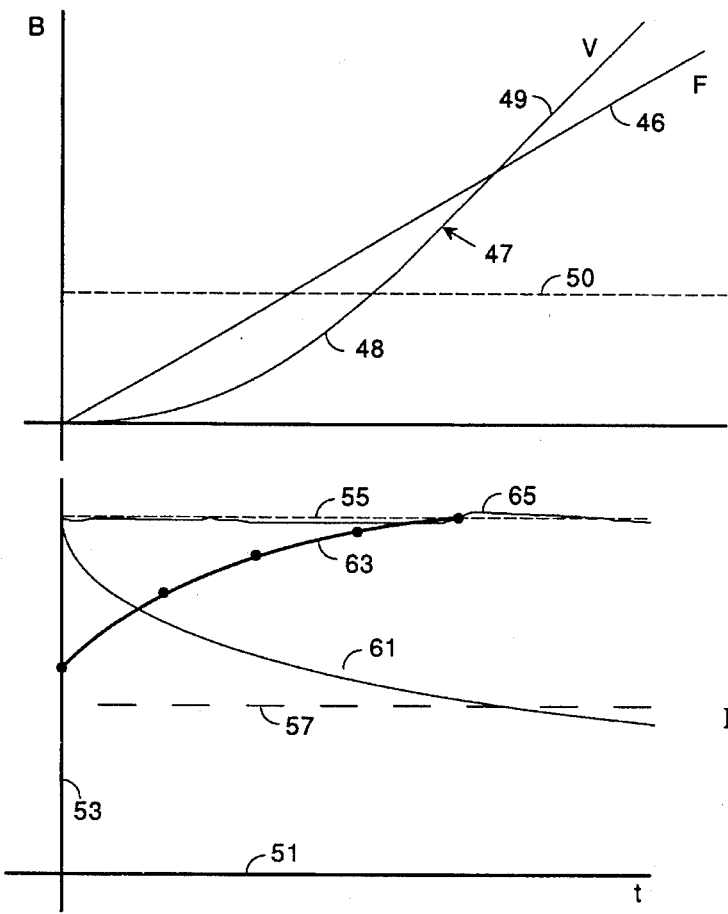
FIG. 2
FIG. 3

OPEN LOOP BRIGHTNESS CONTROL FOR EL LAMP

BACKGROUND OF THE INVENTION

This invention relates to drivers for electroluminescent (EL) lamps and, in particular, to open loop control of the brightness of one or more EL lamps.

EL lamps are widely used for backlighting displays ranging is size from wristwatches and pagers to instrument panels in vehicles. The many advantages of an EL lamp include low power consumption, uniform luminosity (no glare), and adaptability to a wide variety of shapes, sizes, and colors.

An electroluminescent (EL) lamp is essentially a capacitor having a dielectric layer between two conductive electrodes, one of which is transparent. The dielectric layer may include a phosphor powder or there may be a separate layer of phosphor powder adjacent the dielectric layer. The phosphor powder radiates light in the presence of a strong electric field, using very little current. Thus, an EL lamp emits light when an AC voltage is applied and becomes brighter with increasing voltage. However, the phosphor powder "ages", i.e. the lamp dims with age, assuming that the applied AC voltage has a constant magnitude.

The lifetime of an EL lamp is defined as the time from initial turn-on until the lamp dims to half brightness, typically in excess of 1,000 hours. For some products, e.g. wristwatches or pagers, the lifetime of the lamp far exceeds the number of hours that a lamp will actually be turned on and the aging effect is of no consequence. For other products, e.g. instrument panels, an EL lamp may be turned on for a significant fraction of the lifetime of the lamp.

Since the brightness of an EL lamp depends on the magnitude of the applied voltage, a variety of techniques have been used to compensate for aging of the phosphor powder by increasing the voltage applied to the lamp as the lamp ages. The simplest control is a dimmer, with which one manually adjusts the brightness of the lamp to suit one's taste. For EL lamps powered from an AC powerline, a dimmer is simply a potentiometer in series with the lamp. Most EL lamps are driven by an inverter powered by a battery. The inverter typically includes a switching circuit that produces a series of pulses which are coupled to the lamp. The switching circuit can be self-oscillating or driven. Dimming inverters are known in the art and typically use pulse width modulation to change the voltage across the EL lamp.

Automatic brightness controls include optical feedback, in which a photocell monitors lamp brightness and varies the applied voltage to obtain a predetermined brightness, and analogue feedback, in which a lamp property, such as capacitance, is monitored to determine the applied voltage. U.S. Pat. No. 5,089,748 (Ihms) discloses a system including optical feedback for maintaining the brightness of an EL lamp. An optical sensor is expensive and the location of the sensor makes designing a display difficult because the sensor must be hidden and one must make separate connections to the sensor and to the lamp. Unless precision sensors are used, the part-to-part variability in sensors may cause unacceptable results.

Of the various manual and automatic control systems, optical feedback is generally the most effective in maintaining constant brightness but requires a large number of additional and expensive components and is subject to error from ambient light. For example, in automotive applications, ambient light can cause the lamp to dim and darkness will cause the lamp to be lit to full brightness—exactly the opposite of the desired response. In automotive applications, maximum brightness is desired for twilight and a lower brightness is preferred at night.

In many applications, different types of lamps are used, e.g. EL lamps, incandescent lamps, and cold cathode fluorescent lamps. Such lamps respond quite differently to a given voltage reduction, i.e. an EL lamp and an incandescent lamp will dim unequal amounts and a cold cathode fluorescent lamp may extinguish. It is desirable for all of the lamps in a given display to dim in equally.

The manual and the automatic control systems described above are "closed loop" systems, i.e. a first variable, voltage, is controlled in accordance with a second variable, e.g. brightness or capacitance. Control is more accurate if the second variable is either completely dependent or is strongly dependent on the first variable. An "open loop" control system is one in which a variable is simply set to a predetermined value.

In view of the foregoing, it is therefore an object of the invention to provide a low cost system for controlling the brightness of an EL lamp.

Another object of the invention is to provide an open loop control system for maintaining constant brightness in an EL lamp.

A further object of the invention is to provide an open loop control system which uses minimal additional components in a computer controlled display.

Another object of the invention is to provide an open loop control system for dimming an EL lamp to a given brightness irrespective of the life of the lamp.

A further object of the invention is to provide an open loop control system for dimming an EL lamp in unison with other types of lamps.

SUMMARY OF THE INVENTION

The foregoing objects are achieved in the invention in which an EL lamp characterized by non-linear brightness decay is driven to constant brightness for the life of the lamp by an inverter controlled by a microprocessor. The microprocessor controls the inverter in accordance with a table containing data which is the inverse function of the non-linear brightness decay. The microprocessor tracks the total on-time of the EL lamp and selects the appropriate data from the table for driving the lamp. The control can be analog or digital. If the control is analog, the selected data is coupled to a D/A converter which is coupled to the inverter. If the control is digital, the selected data is coupled to a counter driving a pulse width modulator which is coupled to the inverter. In accordance with another aspect of the invention, the lamp is dimmed a precise amount based upon the data in the table.

BRIEF DESCRIPTION OF THE DRAWINGS

A more complete understanding of the invention can be obtained by considering the following detailed description in conjunction with the accompanying drawings, in which:

FIG. 1 is a block diagram of an open loop brightness control system constructed in accordance with the invention;

FIG. 2 is a chart illustrating the operating characteristics of an EL lamp; and

FIG. 3 is a chart of curves representing the operation of a control system constructed in accordance with the invention.

DETAILED DESCRIPTION OF THE INVENTION

In FIG. 1, open loop brightness control system 10 includes controller 11 coupled to inverter 12 by pulse width modulator 15 for controlling the brightness of EL lamp 14. Controller 11 also provides signals to display 18 which is backlit by EL lamp 14. Display 18 can be a liquid crystal device or other component for displaying changing information. Fixed message type displays are simply an overlay or "dead front" on lamp 14.

Controller 11 includes microprocessor 21 powered by battery 22 connected to microprocessor 21 by line 24 and line 26. Resistor 28 and capacitor 29 are connected in series across battery 22 with the junction thereof connected to microprocessor 21 by line 26. As used herein, a "microprocessor" is an integrated circuit containing at least a minimal computing device having registers, an instruction decoder, and an arithmetic logic unit.

Memory for microprocessor 21 includes electrically alterable read only memory (EAROM) 32, random access memory (RAM) 34, and read only memory (ROM) 36. Communication with microprocessor 21 is controlled by input/output interface 41 which couples microprocessor 21 to external devices, such as display 18. Timer 38 is also coupled to microprocessor 21.

Although either analog or digital control can be used for maintaining the brightness of lamp 14, digital control is preferred since accurate control is easily obtained with relatively simple circuitry. Digital control is obtained through counter 44 controlling the pulse width of the signals from modulator 15. Inverter 12 includes circuitry, such as disclosed in U.S. Pat. No. 4,527,096 (Kindlmann) or U.S. Pat. No. 5,313,141 (Kimball) for producing a variable output voltage in accordance with the pulse width of the input signals. Counter 44 can either be a shift register with taps or a counter whose output changes state when a predetermined count is reached.

In accordance with a preferred embodiment of the invention, ROM 36 includes a table containing data representing the appropriate lamp voltage for lamp 14 to produce a constant brightness throughout the life of the lamp. The particular voltages necessary for a certain brightness throughout the life of a lamp are readily determined empirically and the values in the following Table are by way of example only.

TABLE

| Lamp Hours | Lamp Voltage |
|---|---|
| 0 | 108 |
| 500 | 135 |
| 1000 | 162 |
| 1500 | 171 |
| 2000 | 180 |

The data stored in ROM are values which cause the inverter to produce the appropriate lamp voltage for a given total on-time. The actual values stored in ROM depend upon the particular semiconductor components chosen and their transfer characteristics. The number of entries in the table is a matter of design, with more entries providing more accurate compensation than fewer entries.

It is not uncommon for EL lamps to be described with the same terminology used for fluorescent lamps, e.g. a "turn-on" voltage as described in the Ihms patent noted above. EL lamps have non-linear characteristics but the characteristics are not discontinuous, i.e. there are no breaks or gaps in curves describing the characteristics. The hysteresis (different "turn-on" and "turn-off" voltages) noted in the Ihms patent is caused by the power supply, not by the EL lamp, which has no hysteresis. An EL lamp emits light at any non-zero voltage. Depending upon the structure of the lamp, this light might be difficult to detect but it is there. For example, specially made (thin phosphor) lamps can emit useful amounts of light at 40 volts. Photomultiplier tubes can detect light from a typical EL lamp driven at 3–5 volts. The minimum brightness perceptible to the unaided human eye depends upon the amount of ambient light.

As illustrated by the curves in FIG. 2, the brightness (B) of an EL lamp varies with voltage or frequency. As shown by curve 46, brightness varies approximately linearly with frequency. Curve 47 represents the variation of brightness with voltage and includes non-linear portion 48 and linear portion 49. Typically, the minimum desired brightness, represented by curve 50, is above most of the non-linear portion of curve 47. Although a preferred embodiment of the invention is described in terms of a variable voltage, a variable frequency can be used instead for controlling brightness.

In FIG. 3, abscissa 51 represents time and ordinate 53 represents either brightness or voltage. Line 55 indicates the desired level of brightness from an EL lamp throughout the life of the lamp. Line 57 represents the half brightness level of the lamp and curve 61 represents the non-linear brightness decay curve of a typical EL lamp. Curve 63 represents the magnitude of the voltage applied to an EL lamp by inverter 12 during the life of the lamp. As shown, the voltage applied to lamp 14 increases from an initial value along a curve which is approximately the inverse function of curve 61. The dots along curve 63 represent the data points listed in the above table.

Curve 65 represents the brightness of an EL lamp driven by the voltage represented by curve 63. The increase in voltage from inverter 12 during the life of lamp 14 compensates for the aging of the lamp, thereby producing a relatively constant brightness. This correction for brightness can also compensate for any non-linearity in the brightness vs. voltage curve.

Data representing the length of time that lamp 14 is turned on is obtained from timer 38 and is stored in EAROM 32. If battery 22 is disconnected from microprocessor 21, sufficient energy is stored in capacitor 29 to power microprocessor 21 temporarily while executing a shut-down interrupt routine in which timing information is stored semi-permanently in EAROM 32.

In normal operation, lamp 14 is turned on or off automatically in accordance with whatever software microprocessor 21 may be running or is turned on and off manually by way of switch 67 which triggers a short routine for operating the lamp. Either way, microprocessor 21 tracks the on-time of the EL lamp and stores a revised total in EAROM 32 each time that the lamp is shut off.

Microprocessor 21 turns the EL lamp on by retrieving the total on-time from EAROM 32 and looking up the corresponding lamp voltage in the table stored in ROM 36. The table is read and the data is applied through interface 41 to counter 44 which converts the digital data into suitable pulses for driving modulator 15. The output from modulator 15 controls the width of the pulses produced by inverter 12 and, therefore, the voltage applied to lamp 14.

Since the brightness of lamp 14 is approximately linearly proportional to the applied voltage and the applied voltage is controlled by microprocessor 21, the lamp can be dimmed under software control. Further, lamp 14 is accurately dimmed because the effect of lamp age is eliminated. For example, in an automotive radio having a dial backlit by an EL lamp, lamp brightness can be adjusted for night time (dimmed), twilight (full brightness), and daytime (lamp off) without overdriving the lamp or causing the lamp to dim excessively.

Dimming, for example to level 57 in FIG. 3, is easily accomplished by applying what amounts to two, opposing corrections to the lamp voltage. The first correction determines the voltage corresponding to full brightness and the second correction determines the voltage for dimming the lamp to the desired level. Since the voltage and frequency curves (FIG. 2) are essentially linear, dimming is simply taking a fraction of the number from the table in ROM. Thus, an EL lamp can be dimmed to a given brightness level irrespective of the total on-time of the lamp.

Software controlled dimming provides a further advantage since the dimming of an EL lamp can be matched to the dimming of non-EL lamps, e.g. cold cathode fluorescent lamps and incandescent lamps. As illustrated in FIG. 1, controller 11 is coupled to incandescent lamp 71 by dimmer 72 coupled to digital-to-analog (D/A) converter 43. Controller 11 is also coupled to cold cathode fluorescent lamp 75 by inverter 76 and pulse width modulator 77. Lamp 71 and lamp 75 have brightness vs. voltage characteristics that are different from each other and different from curve 49 in FIG. 2. The different characteristics are readily accommodated in accordance with the invention by providing separate tables in ROM for each type of lamp. Each lamp is dimmed in accordance with the appropriate table and, thus, each lamp can be dimmed in unison.

The separate elements of controller 11 can be found in a single integrated circuit, such as an MC68HC11 sold by Motorola Inc. Alternatively, controller 11 can be constructed from separate components, including a relatively simple microprocessor such as used in horological and pager applications. In such applications, controller 11, or its components, are used for other purposes, and an inverter and EL lamp are also already provided. In order to implement the invention, one need only modify the inverter to provide a controllable lamp voltage and to couple the inverter to the microprocessor, a modification which adds few components to a product. The invention thus provides a low cost, open loop system for producing constant brightness in an EL lamp.

Having thus described the invention, it will be apparent to those of skill in the art that various modifications can be made within the scope of the invention. For example, the lamp voltage from inverter 12 can be controlled by a variable current instead of a variable voltage. Although a look-up table is preferred, one could calculate the appropriate lamp voltage from a formula representing curve 61, but it would take a microprocessor longer to calculate the appropriate value than to look it up in a table. The data from the table is retrieved simply by adding the number representing total on-time, or a fraction thereof, as an offset to a pointer to the memory address of the start of the table, then reading the data from the offset address in the table. This process is only four of five steps long and is much faster than calculating according to a formula. An even faster technique would be to apply the number representing total on-time directly to a D/A converter or to a counter but this does not provide uniform brightness because the brightness decay curve is non-linear and EL lamp brightness is approximately linearly proportional to voltage. Incandescent lamp 71 can be controlled digitally rather than by an analog voltage and EL lamp 14 or fluorescent lamp 75 can be controlled by an analog voltage.

What is claimed is:

1. An open loop control system for controlling the brightness of an EL lamp, said control system comprising:

an inverter coupled to said EL lamp for driving said lamp;

a controller including a microprocessor and a memory, wherein said memory contains a number representing the total length of time said lamp has been lit and contains a table of data representing lamp voltages for driving said lamp to a predetermined brightness during the life of said EL lamp;

means for interconnecting said microprocessor and said inverter;

wherein said microprocessor retrieves data from said table in accordance with said number and couples the retrieved data to said means, said means produces an output signal in accordance with said retrieved data for causing said inverter to produce a lamp voltage having a predetermined magnitude for driving said EL lamp to said predetermined brightness irrespective of the total on-time of said EL lamp.

2. The control system as set forth in claim 1 in which said memory includes a ROM for storing said table.

3. The control system as set forth in claim 2 in which said memory includes a EAROM for storing said number representing the length of time said lamp has been lit.

4. The control system as set forth in claim 1 and further comprising means for temporarily powering said controller.

5. The control system as set forth in claim 1 wherein said memory includes a table for dimming said EL lamp to a predetermined, reduced brightness irrespective of the total on-time of said EL lamp.

6. The control system as set forth in claim 1 wherein said means includes:

a counter for receiving said retrieved data; and a pulse width modulator coupled to said counter and to said inverter.

7. The control system as set forth in claim 1 wherein said means includes:

a D/A converter for receiving said retrieved data and converting said retrieved data into a control voltage for said inverter.

8. The control system as set forth in claim 1 wherein said memory includes a table for driving an incandescent or a fluorescent lamp.

9. The control system as set forth in claim 8 wherein said memory includes a table for dimming said incandescent lamp or said fluorescent lamp in unison with said EL lamp.

10. A method for producing uniform brightness from an EL lamp characterized by a non-linear brightness decay curve, said method comprising the steps of:

storing a table containing data which is the inverse function of said non-linear brightness decay curve in a memory circuit;

storing a number representing the total on-time of said lamp in said memory circuit;

selecting data from said table by a microprocessor, wherein said data is selected in accordance with said number; and controlling the voltage applied to said lamp in accordance with the selected data.

* * * * *